United States Patent
Casey et al.

(10) Patent No.: US 6,777,839 B2
(45) Date of Patent: Aug. 17, 2004

(54) SPOKE CONSTRUCTION FOR AN AC GENERATOR'S TWO-PIECE EXCITER DIODE WHEEL

(75) Inventors: James T. Casey, Maple Grove, MN (US); Marvin A. Bail, Roseville, MN (US)

(73) Assignee: Electric Machinery Company, Inc., Minneapolis, MN (US)

( * ) Notice: Subject to any disclaimer, the term of this patent is extended or adjusted under 35 U.S.C. 154(b) by 118 days.

(21) Appl. No.: 09/934,167

(22) Filed: Aug. 20, 2001

(65) Prior Publication Data

US 2003/0038559 A1 Feb. 27, 2003

(51) Int. Cl.$^7$ ................ H02K 11/04; H02K 15/02; H02K 19/38
(52) U.S. Cl. ................ 310/68 D; 310/261; 29/598
(58) Field of Search ............... 310/68 D, 261; 74/572; 29/598

(56) References Cited

U.S. PATENT DOCUMENTS

| | | | | |
|---|---|---|---|---|
| 559,910 A | * | 5/1896 | Reist | 310/265 |
| 670,385 A | * | 3/1901 | Howland-Sherman | 74/572 |
| 3,965,379 A | * | 6/1976 | Meusel et al. | 310/68 R |
| 6,107,711 A | | 8/2000 | Borchert | 310/68 |
| 2003/0038559 A1 | * | 2/2003 | Casey et al. | 310/216 |

FOREIGN PATENT DOCUMENTS

JP          54050908     *  4/1979   ............... 310/68 D

* cited by examiner

Primary Examiner—Burton S. Mullins
Assistant Examiner—David W. Scheuermann
(74) Attorney, Agent, or Firm—Nawrocki, Rooney & Sivertson, P.A.

(57) ABSTRACT

A diode wheel has a two-piece structure including a hub and spoke assembly (spoke assembly) and a drum. The spoke assembly is unitary with spokes projecting radially from a central hub. The drum's inner surface is a circular cylinder. The drum is shrunk-fit onto the outer ends of the spokes carried by the spoke assembly by heating the drum and then cooling the drum after properly positioning the drum on the spoke assembly. The outer end of each spoke is configured as a pad whose outer surface area in contact with the inner drum surface is substantially larger than the minimum cross sectional area of the arm. The pad presses against and supports the inner surface of the drum, and reduces stress concentrations in both the spoke assembly and the drum. In a preferred embodiment, the outer surface of each spoke is a segment of a circular cylinder whose radius of curvature forms an interference fit at room temperature with the inner surface of the drum.

19 Claims, 4 Drawing Sheets

SPOKE CONSTRUCTION FOR AN AC GENERATOR'S TWO-PIECE EXCITER DIODE WHEEL

BACKGROUND OF THE INVENTION

Large synchronous AC generators produce the AC power for many power grids throughout the world. These generators comprise a generator shaft, a rotor having a main field winding mounted on the shaft, a stator, and a frame for supporting the stator and the shaft. The rotor and stator each comprise iron conductors for magnetic flux. The stator has a stationary armature winding mounted on the inner surface of the stator frame. The stator armature winding produces the AC power from a rotating magnetic field provided by the rotor's main field winding. DC current flowing in the main field winding produces this magnetic field. Mechanical torque applied to the generator shaft rotates the shaft and the main field winding. The main field winding's rotating magnetic field induces the output AC current within the armature winding. This induced AC current is then applied to the power grid to increment the power provided by other similar generators.

Originally, slip rings were used to provide the DC current to the main field from a source external to the generator. While this design functioned adequately, the slip rings did require frequent maintenance. Newer designs avoid slip rings by providing DC power from an exciter generator mounted on the generator shaft and electrically connected to the main field winding.

The exciter generator usually contains a three-phase armature winding and rectifier bridge mounted on the rotor. A stationary field exciter winding surrounding the exciter armature receives from an external source, a DC current sufficient to produce a strong stationary magnetic field surrounding the exciter winding and the exciter armature. As the generator shaft rotates, AC voltage is induced in the exciter winding. Diodes connected in a bridge circuit rectifier convert the AC current induced in the exciter winding (exciter current) to DC. The DC exciter current output from the rectifier is then conducted to the main field winding by heavy buses.

Typically, the rectifier diodes are mounted on a special cylindrical carrier called a diode wheel. Typical diode wheels have a hub for attachment to shaft or the exciter armature and six radially projecting arms or spokes projecting from the hub. The spokes support a drum. The drum is typically eight to 12 in. wide and 15 to 24 in. in diameter depending on the current to be generated. Diode wheels are usually made from steel. The diodes are mounted on the interior drum surface and are electrically connected to each other to form the bridge circuit.

The diode wheel is mounted axially adjacent to the exciter armature and rotates with the generator shaft, serving in effect as a rotating carrier for the diodes. At least six diodes are typically mounted on the diode wheel in a 3-phase, full wave bridge rectifier circuit receiving AC from the exciter windings. The exciter current generated by the exciter generator and applied to the main field windings is large, in the range of hundreds or even thousands of amperes. Because of these large currents, the diodes and the large buses electrically connecting the diodes to each other and to the main field winding on the rotor must be able to carry substantial current and must operate reliably at high temperatures and under high centripetal forces. Minimizing diode temperature both increases the current capacity of the diodes and lengthens their life as well. To deal with this heat, it is important to provide a superior heat sink for these diodes.

In spite of suitable ambient temperature, the diodes occasionally fail and must be replaced. Power diodes of the type used in these exciter bridge circuits usually fail in a reverse conducting mode, which results in a short across the diode and a short across a phase of the exciter winding. This creates the potential of significant damage to the exciter winding. Because of this failure mode, the practice is to use two diodes in series as a single diode element in the bridge circuit so that if one diode fails the other of the pair will continue to function to protect the winding and allow normal operation. Once a diode fails however, the exciter is at risk should the second of the pair fail, so it is useful to continuously monitor the status of each diode.

However, monitoring diode status has problems. The diode wheel rotates in the enclosed space of a large power generator, and so the diodes it carries are not easily accessible. Slip rings can be used to conduct signals indicating diode status, but these too tend to wear and require regular preventive maintenance. In one system now deployed, status of the diodes and of other operating parameters as well for the main and exciter armatures are transmitted by RF signals to an adjacent receiver, avoiding the problem of slip rings.

As mentioned, a diode should be replaced relatively quickly if it fails. Of course, this requires shutting down the entire generator. Idling a generator for such maintenance or for any maintenance for that matter, takes an expensive generator out of service for a period of time and makes the installation less profitable. To minimize down time, each diode pair can be mounted in a module. Rather than having to loosen the mount for an individual diode in cramped quarters, the repairer simply unbolts the electrical and mechanical connections for the module from the inside of the drum and the then reverses the procedure with a new module.

The modules must mount securely to the drum interior because of the high centripetal forces developed by the high-speed rotation. For two reasons, the drum interior should be smooth and have internal geometry that precisely matches that of the contacting module surface. In the first place the matched geometry results in more direct metal-to-metal contact, improving heat transfer from the modules to the drum.

Secondly, when the module is bolted to the drum interior, the corresponding outer surface of the diode module is forced to conform to the drum surface. If the two surfaces do not have substantially identical geometry, the forces applied by the bolts flexes the module housing slightly, which may result in damage in the diode module. The only reasonable way we know to assure identical geometry is for the two surfaces to have substantially identical cylindrical radii of curvature and near-specular finishes.

However, we have found that it is difficult to machine the interior surface of the drum where the drum is integral with the spokes. A solution to this problem has been to construct the hub and spokes as one piece of the diode wheel and the drum as another piece, allowing the drum's interior to be machined without interference from the spokes. The drum's interior diameter is dimensioned to be very slightly smaller than the circle defined by the ends of the spokes when both are at room temperature. The drum is then heated sufficiently to expand it to a diameter slightly greater than the spoke ends. The drum is slipped onto the spokes, after which the drum is cooled causing it to shrink and fit tightly onto the hub and spokes.

While this design dramatically improves the fit of the drum surface to the modules, we find that shrink-fitting the drum to the spokes creates a new set of problems. Points of high stress in the spokes and the drum occur creating the potential for mechanical failure. The drum can distort from a perfect circle shape, causing balance and run-out problems during the high-speed rotation. These issues must be addressed to form a satisfactory two-piece diode wheel, and have created significant problems for us.

BRIEF DESCRIPTION OF THE INVENTION

We have devised a two-piece diode wheel for use in a brushless exciter that solves many of these problems. As previously explained, such a diode wheel has a peripheral drum for carrying a plurality of diodes and a hub having an axis of rotation. The hub has a plurality of radially extending spokes contacting the interior of the drum and supporting the drum in a substantially fixed position relative to the hub. To reduce stress concentrations, we provide at the outer end of at least a first of the spokes, an outer surface having an area substantially greater than the minimum cross sectional area of the spoke. This substantially greater area of the outer spoke surface reduces stress concentrations in both the drum and the spoke.

In one preferred version of the invention, the drum has at room temperature a circularly cylindrical interior surface having a predetermined radius. Each spoke's outer surface has at room temperature a radius of curvature relative to the hub's axis of rotation, very slightly larger than the predetermined drum's interior surface radius, and dimensioned to allow a shrink fit between the spoke ends collectively and the drum interior. The spokes' outer surfaces collectively define a cylinder forming at room temperature an interference fit with the drum's interior surface radius. In a preferred embodiment of this version, the at least first spoke has at its outer end a pad, said pad overhanging the first spoke at least angularly.

DESCRIPTION OF THE PREFERRED EMBODIMENTS

Figure 1:
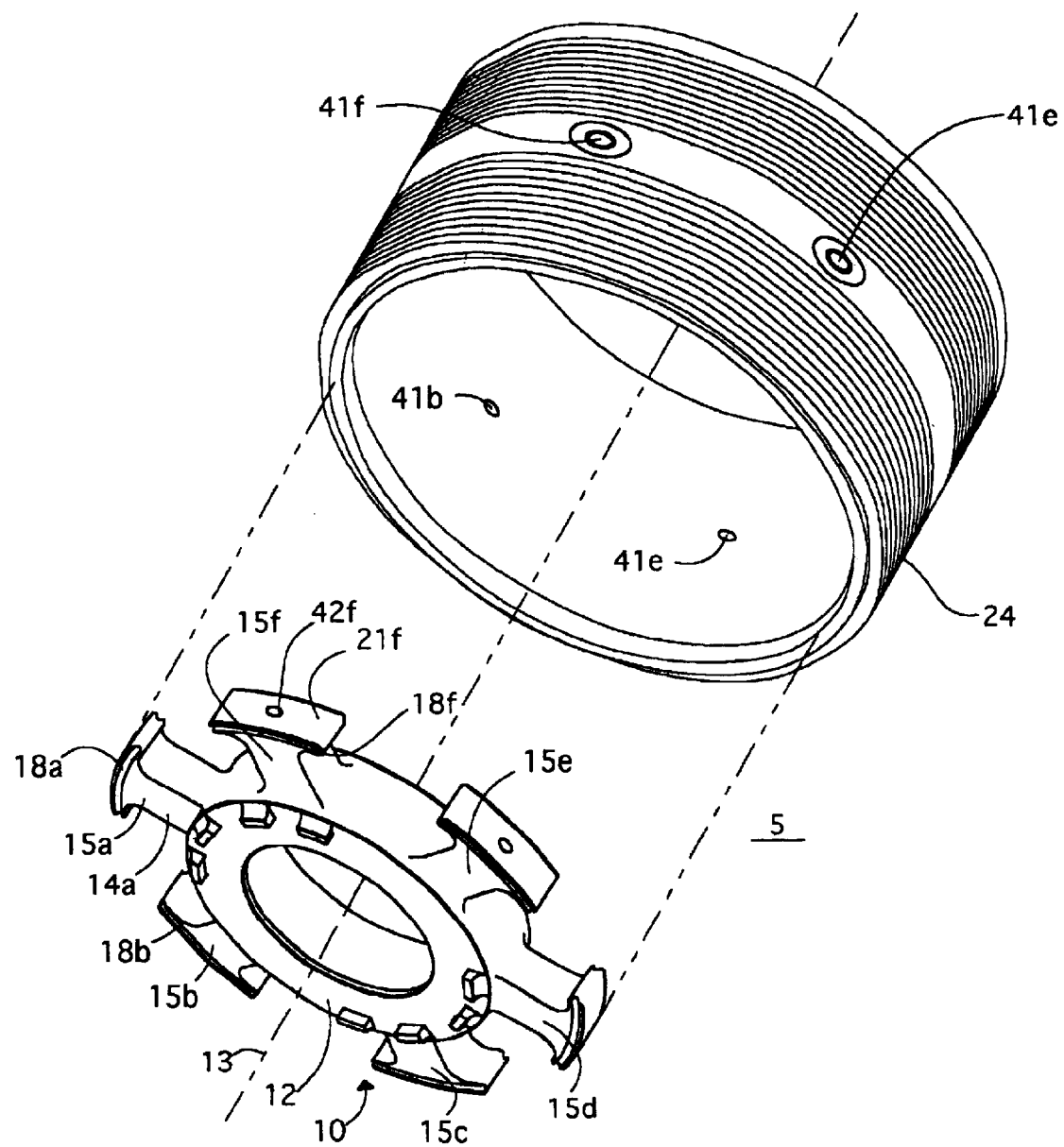
FIG. 1 is a perspective view of the diode wheel in exploded form

FIG. 1 shows a perspective of a diode wheel 5 in exploded form with the drum 24 in axial alignment with the hub and spoke assembly (hereafter spoke assembly) 10. The diode wheel 5 is quite large and heavy. In one embodiment, drum 24 is made of steel and has nominal room temperature dimensions as follows:

| | |
|---|---|
| Outer diameter | 20.00 in. (50.8 cm.) |
| Inner diameter | 17.374 in. (44.13 cm.) |
| Width | 9.78 in. (24.8 cm.) |
| Wall thickness | 1.3 in. (3.33 cm.) |
| Weight | Ca. 60 lbs. (27.3 kg.). |

Figure 4:
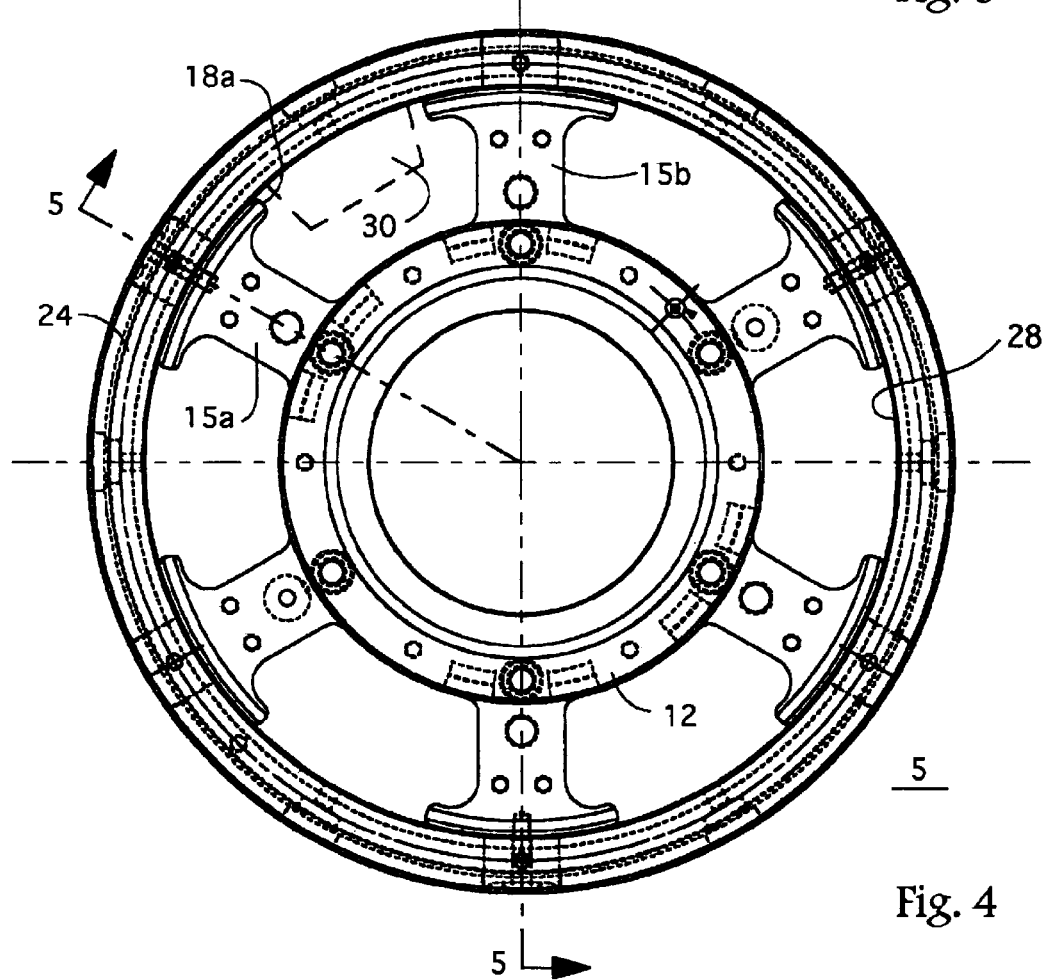
FIG. 4 is an axially oriented elevation view of the assembled diode wheel.

These dimensions are consistent with safely resisting centripetal forces of several hundred G's caused by the customary high rotational speed of 3,600 rpm for diode wheel 5. An individual diode module as shown in dashed outline at 30 (FIG. 4) mounted between individual spokes 15*a* and 15*b* with bolts through holes in drum 24.

Figure 2:
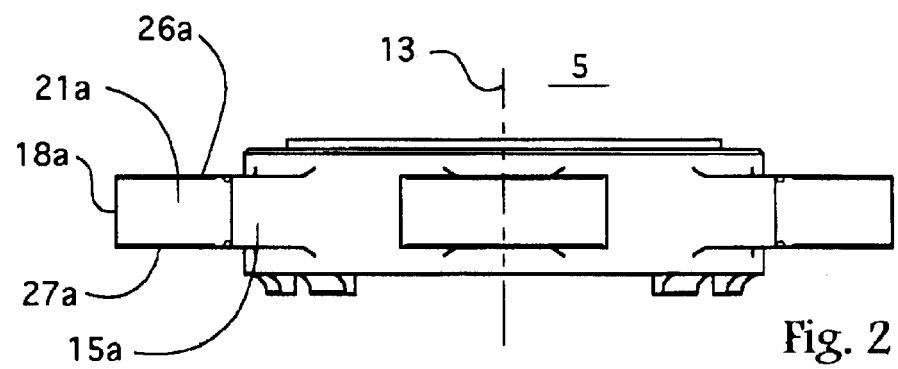
FIG. 2 is a radially directed elevation view of a hub and spoke element of the diode wheel.
Figure 3:
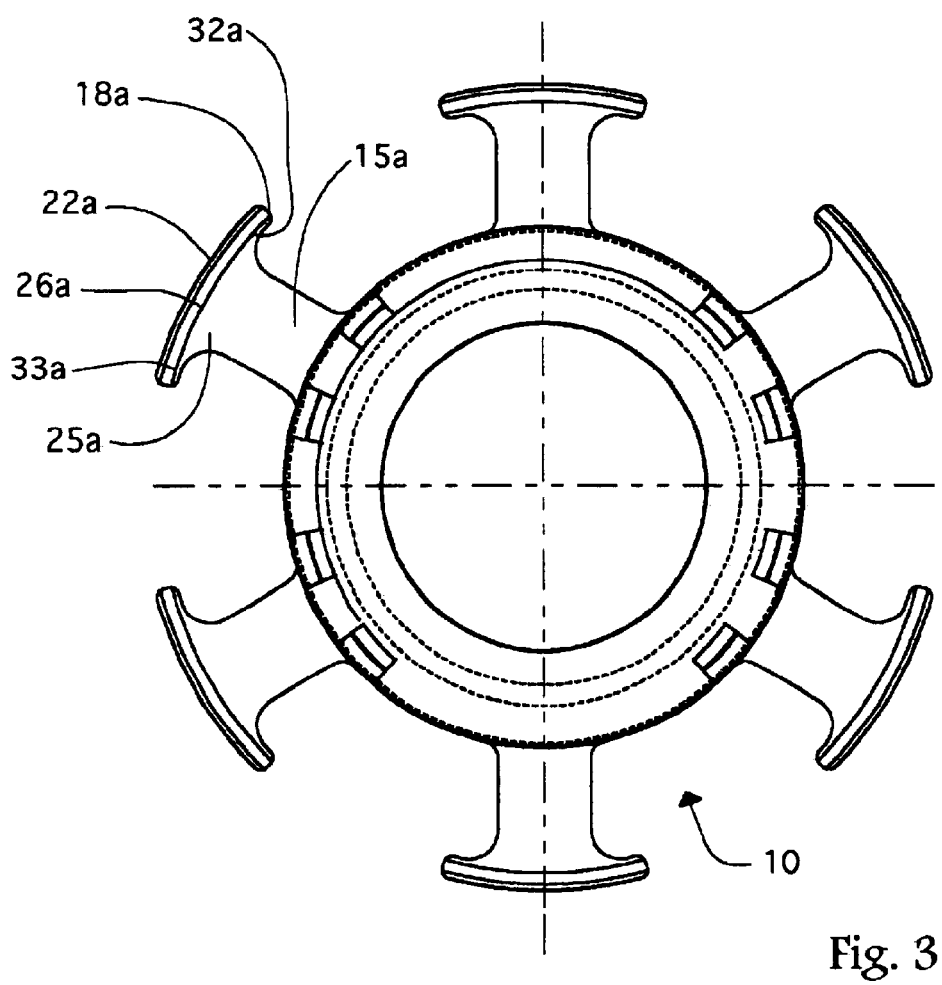
FIG. 3 is an axially directed elevation view of the hub and spoke element.
Figure 6:
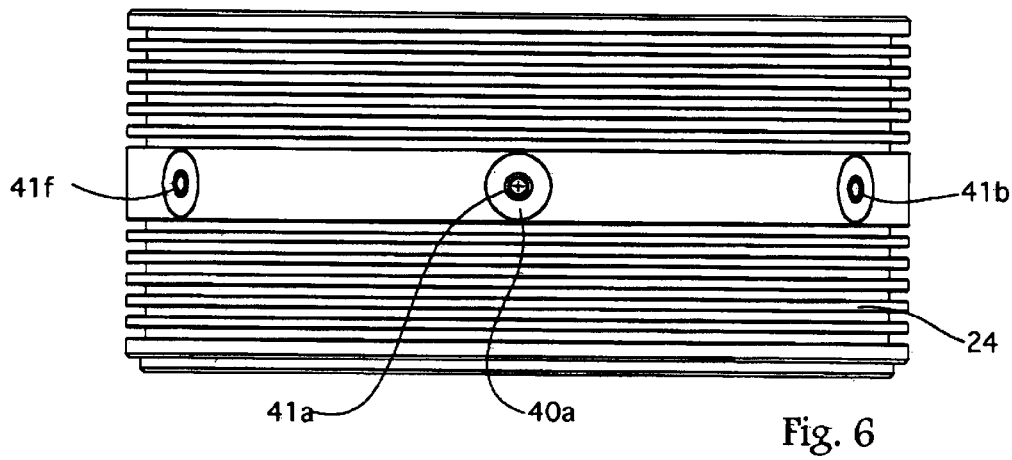
FIG. 6 is a radially directed elevation view of a drum element of the diode wheel.
Figure 3A:
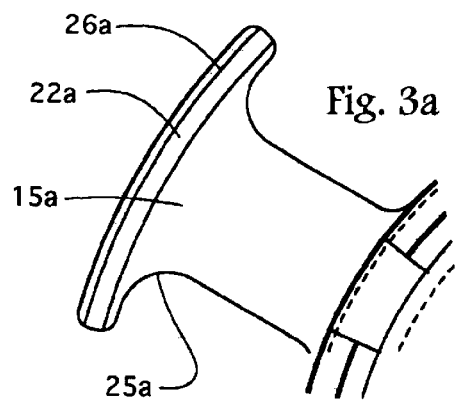
FIG. 3*a* is a detail of one spoke of FIG. 3 showing a stress-relieving groove therein.

Spoke assembly 10 is preferably unitary with six spokes 15*a*, 15*b*, etc. projecting radially from a central hub 12. A central, circular hole in hub 12 accommodates mounting of the diode wheel 5 on a generator shaft. Hub 12 is shown with an axis of rotation 13 that serves as the axis of rotation for the entire diode wheel 5. Structural features of the individual spokes 15*a*, 15*b*, etc. are important elements of the invention. (Hereafter reference will be mainly to spoke 15*a*, and the reader can assume that each of the other spokes 15*b*, 15*c*, etc. are unless otherwise stated, identical for purposes of describing the invention.) Spokes 15*a*, 15*b*, etc. are positioned in the preferred embodiment at precisely 60° angular intervals and project at precisely right angles to axis 13. As shown in FIGS. 2 and 3, spoke 15*a* has parallel sides (constant cross section for a portion of its radial length) both at depth (axial) and width (angular) dimensions. One embodiment of a spoke assembly 10 has spokes 15*a*, etc. with a minimum cross section of 2.0 in. (5.1 cm.) wide and 1.5 in. (3.8 cm.) depth (in the axial direction).

The outer end of spoke 15*a* is configured as a pad 18*a* having an outer surface 21*a* whose surface area is substantially larger than the minimum cross sectional area of arm 15*a*. Surface 21*a* is intended to bear against the inner surface 28 (see FIG. 4) of drum 24. To achieve the larger surface area, pad 18*a* has in its preferred embodiment, what we call angular overhangs or arms generally shown at 32*a* and 33*a* in both leading and following positions, i.e., on both sides of spoke 15*a* when viewed in axial elevation as in FIG. 3. By "angular overhang" we mean that the pad 18*a* extends to subtend a substantially greater angle measured relative to axis 13 than does the spoke section 14*a* closer to hub 12. We prefer that the angular overhangs at 32*a* and 33*a* are symmetrical. (Where angular relationships among features of spokes 15*a*, etc. and other features of diode wheel 5 are mentioned, these are referenced to axis 13 unless otherwise stated.) In the example above, pad 18*a* subtends an angle of 34. For the embodiment described above, this provides, for a dimension of pad 15*a* along the arc of around 5.2 in. (13.2 cm.). The axial dimension of pad 18*a* is preferably 1.5 in. (3.8 cm.) in the axial direction, the same depth as spoke 15*a*. Thus the ratio of the outer surface 21*a* area to the minimum cross sectional area of arm 15*a* is approximately 2.6:1. Area ratios as small as 1.5:1 and perhaps even smaller surely will qualify surface 21*a* as "substantially larger" than the minimum cross sectional area of arm 15*a*. Near the end of each overhang 32*a* and 33*a*, the radially measured thickness of pad 18*a* is 1.0 in (2.5 cm.).

In the embodiment described above, surface 21*a* and similar surfaces 21*b*, etc. each form a segment or section of a circular cylinder (hereafter "spoke cylinder") centered on axis 13 and whose room temperature diameter is slightly larger than the inner diameter of drum 24 at room temperature. Heating drum 24 to say 300° F. increases its diameter to greater than that of the spoke cylinder, allowing the spoke assembly 10 to be slipped into drum 24. When drum 24 cools and shrinks onto pads 18a etc., this shape of pad surfaces 21a etc. provides for distributed loading of inwardly directed radial stress and reduced maximum stresses in both the spoke assembly 10 and drum 24. The pad 18a deflects slightly in the areas of overhangs 32a and 33a, further reducing stress concentrations. Of course, other shapes and relative dimensions of pad 18a and surface 21a may also allow for reduced stresses in spoke assembly 10 and drum 24, and less distortion in the shape of drum 24.

We prefer that pad 18a has a profile in the axial elevation view shown in FIG. 3 that blends smoothly with spoke 15a in a transition area 25a of the pad 15a. That is, pad 18a becomes progressively thinner at greater angular distances from a centerline of spoke 15a. This further reduces stress concentrations in pad 15a by allowing greater deflections or bending as beams, in the ends of pads 15a. In point of fact, the deflections in overhangs 32a and 33a are very small, usually only on the order of a few thousandths of an inch. Yet these small deflections substantially reduce stress concentrations in both the spoke assembly 10 and the drum 24.

To further distribute stress over the pad 18a and surface 21a, a groove 22a is formed in two axially facing surfaces 26a and 27a of pad 15a, surface 26a being shown in elevation view in FIG. 3. Each of the axially facing surfaces 26a and 27a intersect pad surface 21a, defining thereby a curved line of intersection. Axially facing surface 26a has a groove 22a having a predetermined spacing from the line of intersection, as does surface 27a, although this groove is not shown. For the commercial embodiment whose dimensions were specified above, groove 22a may be spaced from the line of intersection by 0.25 in. (0.64 cm.), and have a semicircular cross section 0.25 in. (0.64 cm.) wide and 0.125 in. (0.32 cm.) deep (all dimensions nominal). Although groove 22a is quite small and shallow, we find that it further reduces stress concentration in pad 15a and drum 24.

Although the shrink fit of drum 24 onto spoke assembly 10 is very secure by reason of the spoke assembly 10 and drum 24 radially expanding together in rotation, a lingering doubt does remain that under the extreme high-speed rotation, drum 24 could loosen on assembly 10. For greater reliability, we prefer to bore a radially directed hole 41a in the area of drum 24 in radial alignment with spoke 15a. Spoke 15a has a radial hole 42a in radial alignment with hole 41a. Hole 42a has threads into which a pin is turned to assure that drum 24 is permanently attached to spoke assembly 10. Of course, at least three spokes 15a, etc. at equal angular spacings, and preferably every spoke 15a, etc. has its own radial hole in alignment with a hole in drum 24 similar to hole 41a, and into which a pin is threaded.

Figure 7:
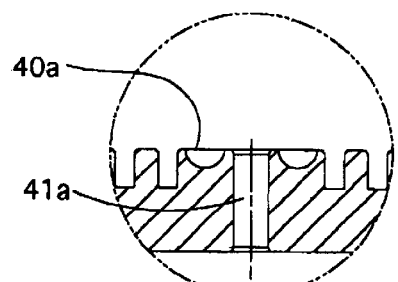
FIG. 7 is a detail of the stress-relieving groove surrounding a retaining pin hole in the drum element.
Figure 8:
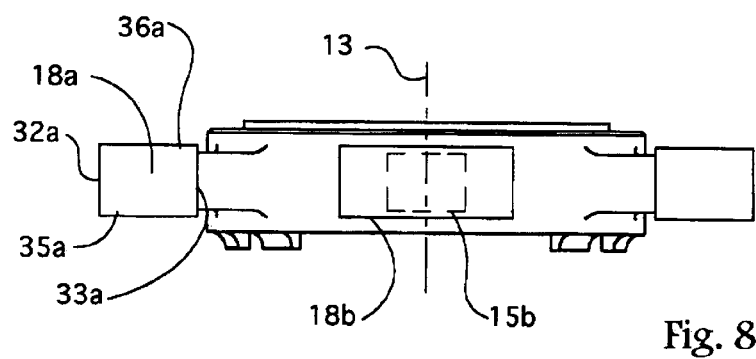
FIG. 8 is an alternative shape for a spoke end.
Figure 5:
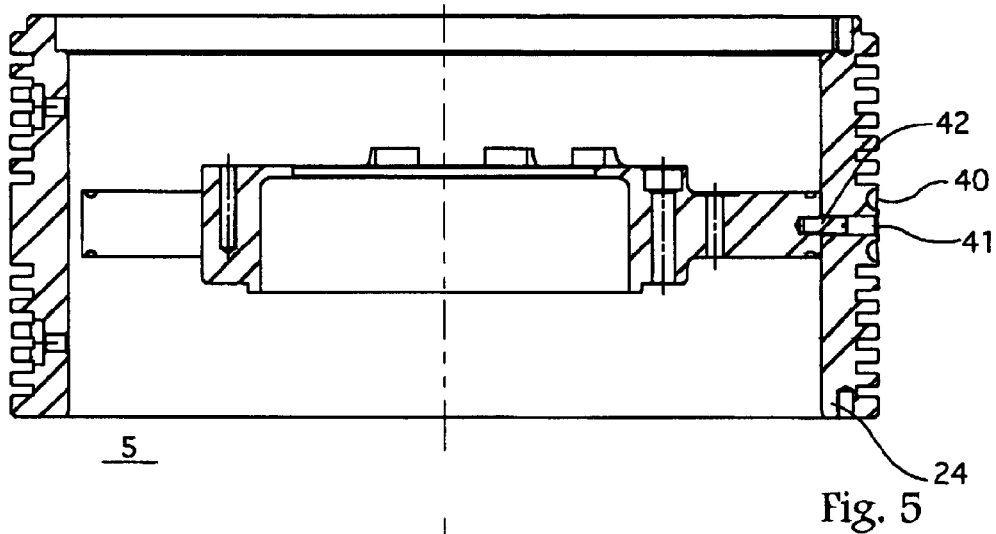
FIG. 5 is a section view of the diode wheel as shown in FIG. 4.

We found a further point of stress concentration occurring in the vicinity of hole 41a. We then discovered that a circular groove 40a, best seen in the detail of FIG. 7, concentric to and surrounding hole 41a relieves this stress concentration. Groove 40a has an inner radius somewhat larger than the radius of hole 41a. In the embodiment whose dimensions were mentioned above, hole 41a may have a radius of 0.22 in. (0.56 cm.). Groove 40a may have a semicircular cross section. In the view of FIG. 7, groove 40a has an inner radius of 0.3 in. (0.76 cm.), a width of 0.5 in. (1.27 cm.), and a depth of 0.25 in. (0,63 cm.). FIG. 8 shows a different arrangement for pad 18a.

FIG. 8 shows an alternative design for the pads 18a, etc. In FIG. 8, pad 18a has axial overhangs 35a and 36a as well as the angular overhangs 32a and 33a. The design of FIG. 8 does not have groove 22a. Spoke 15b is shown in dotted outline beneath pad 18b. While we expect that overhangs 35a and 36a will further reduce stress concentration, we do not prefer to add overhangs 35a and 36a at this time because of the difficulty of machining such structures. Should one construct a spoke 15a with axial overhangs 35a and 36a, we expect that stress concentration will be reduced if the overhangs 35a and 36a are blended into spoke 15a in a manner similar to the blending for overhangs 31a and 32a. The preceding describes our invention.

What we claim is:

1. A two-piece diode wheel for use in a brushless exciter, said diode wheel having a peripheral drum for carrying a plurality of diodes and a hub having an axis of rotation, said hub having a plurality of radially extending spokes contacting an interior of the drum and supporting the drum in a substantially fixed position relative to the hub, wherein the improvement comprises an outer end of at least a first of the spokes having an outer surface, said outer surface having an area substantially greater than the minimum cross sectional area of the spoke, wherein said drum has a circularly cylindrical interior surface having a predetermined radius, and wherein each spoke's outer surface has a radius of curvature relative to the hub's axis of rotation defining a cylinder forming at room temperature an interference fit with the drum's interior surface radius.

2. The improved diode wheel of claim 1, wherein the pad overhangs the spoke axially.

3. The improved diode wheel of claim 2, wherein the pad overhangs the spoke in both axial directions.

4. The improved diode wheel of claim 1, wherein the at least first spoke has at its outer end a pad, said pad overhanging the first spoke at least angularly.

5. The improved diode wheel of claim 4, wherein the pad has a profile in an axial elevation view blending with the spoke in a transition area of the pad from the pad surface to the spoke.

6. The improved diode wheel of claim 4, wherein at least three spokes equally spaced have a bore extending radially from the pad's outer surface toward the hub to a predetermined depth, and the drum has a radially extending hole penetrating the drum and aligned with the spoke's bore, said drum having on its outer surface a circular groove surrounding the drum's hole, said circular groove having an inner radius larger than the radius of the drum's hole, said drum's hole and said spoke's bore for receiving a pin.

7. The improved diode wheel of claim 4, wherein the pad overhangs the spoke angularly both leading and following.

8. The improved diode wheel of claim 7, wherein the pad overhangs the spoke axially.

9. The improved diode wheel of claim 7, wherein the pad overhangs the spoke in both axial directions.

10. The improved diode wheel of claim 7, wherein the pad overhangs the spoke angularly and symmetrically.

11. The improved diode wheel of claim 7, wherein the pad has at least one axially facing surface intersecting the pad's outer surface and defining thereby a curved line of intersection, said axially facing surface having a groove having a predetermined spacing from the line of intersection.

12. The improved diode wheel of claim 11, wherein said groove has a substantially constant spacing from the curved line of intersection.

13. A two-piece diode wheel for use in the exciter for a generator armature winding, said diode wheel having a peripheral drum for carrying a plurality of diodes and a hub having an axis of rotation, said hub having a plurality of radially extending spokes contacting the interior of the drum and supporting the drum in a substantially fixed position relative to the hub, said drum having a circularly cylindrical interior surface having a predetermined radius at room temperature, wherein the improvement comprises at the outer end of at least a first of the spokes, a pad integral with the outer end of the spoke and having an outer surface with an area substantially larger than the minimum cross sectional area of the spoke, said pad's outer surface having a radius of curvature relative to the hub's axis of rotation forming an interference fit with the drum's interior surface radius.

14. The improved diode wheel spoke of claim 13, wherein the pad overhangs the first spoke angularly both leading and following.

15. The improved diode wheel spoke of claim 13, wherein the pad overhangs the first spoke angularly.

16. The improved diode wheel spoke of claim 13, wherein the pad overhangs the first spoke angularly and symmetrically both leading and following.

17. The improved diode wheel spoke of claim 13, wherein the pad overhangs the first spoke axially.

18. The improved diode wheel spoke of claim 13, wherein the pad overhangs the first spoke in both axial directions.

19. The improved diode wheel of claim 13, wherein the first spoke has a radially aligned hole, the drum has a hole aligned with the first spoke's hole, and the outer surface of the drum has a circular groove surrounding and concentric with the drum's hole.

* * * * *